United States Patent
Sato et al.

(10) Patent No.: US 10,635,514 B2
(45) Date of Patent: Apr. 28, 2020

(54) STORAGE DEVICE, HOST SYSTEM, AND INFORMATION PROCESSING SYSTEM

(71) Applicant: TOSHIBA MEMORY CORPORATION, Tokyo (JP)

(72) Inventors: Masayoshi Sato, Yokohama Kanagawa (JP); Ichirou Hara, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 94 days.

(21) Appl. No.: 15/905,804

(22) Filed: Feb. 26, 2018

(65) Prior Publication Data

US 2019/0073255 A1    Mar. 7, 2019

(30) Foreign Application Priority Data

Sep. 6, 2017 (JP) .................. 2017-171577

(51) Int. Cl.
*G06F 11/07* (2006.01)
*G06F 3/06* (2006.01)
*G06F 11/30* (2006.01)

(52) U.S. Cl.
CPC ........ *G06F 11/0727* (2013.01); *G06F 3/0617* (2013.01); *G06F 3/0619* (2013.01); *G06F 3/0653* (2013.01); *G06F 3/0658* (2013.01); *G06F 3/0679* (2013.01); *G06F 3/0683* (2013.01); *G06F 11/3034* (2013.01)

(58) Field of Classification Search
CPC .................................................. G06F 11/0727
USPC ........................................ 714/723, 727, 721
See application file for complete search history.

(56) References Cited

U.S. PATENT DOCUMENTS

| | | | |
|---|---|---|---|
| 5,490,155 A * | 2/1996 | Abdoo | G06F 11/1028 714/763 |
| 5,710,800 A * | 1/1998 | Ito | G06F 13/385 375/369 |
| 5,925,144 A * | 7/1999 | Sebaa | G01R 31/31813 714/30 |
| 6,363,511 B1 * | 3/2002 | Massoudi | G11B 20/1833 714/755 |
| 7,359,833 B2 | 4/2008 | Aoki et al. | |
| 7,523,354 B2 | 4/2009 | Sato | |
| 2006/0277354 A1 | 12/2006 | Tomii | |
| 2011/0292102 A1 * | 12/2011 | Asauchi | B41J 2/17546 347/5 |
| 2014/0164862 A1 * | 6/2014 | Wang | G06F 11/3656 714/736 |

FOREIGN PATENT DOCUMENTS

| | | |
|---|---|---|
| JP | 2006-031335 A | 2/2006 |
| JP | 2006-343822 A | 12/2006 |
| JP | 2007-200171 A | 8/2007 |

* cited by examiner

*Primary Examiner* — Fritz Alphonse
(74) *Attorney, Agent, or Firm* — Kim & Stewart LLP

(57) ABSTRACT

A storage device includes a receiving circuit including a correction circuit configured to correct an input signal from a host system based on correction factors and output the corrected input signal as an output signal containing a data value that is to be stored in the storage device, an interface controller configured to adjust the correction factors based on a difference value generated by the correction circuit using the output signal, and a transmission circuit configured to transmit the correction factors to the host system.

20 Claims, 14 Drawing Sheets

*FIG. 6*

| TIME | CONNECTION STATE | C0 | C1 | C2 | ... | CN~LI |
|---|---|---|---|---|---|---|
| ○○HOURS ○○MINUTES | ... | ... | ... | ... | ... | ... |
| ○○HOURS ○○MINUTES | ... | ... | ... | ... | ... | ... |
| ○○HOURS ○○MINUTES | ... | ... | ... | ... | ... | ... |
| ○○HOURS ○○MINUTES | ... | ... | ... | ... | ... | ... |
| ○○HOURS ○○MINUTES | ... | ... | ... | ... | ... | ... |

FIG. 7A
USER TERMINAL DEVICE

START

S301 — DISPLAY RESULT

S302 — DISPLAY RESULT

END

FIG. 7B
HOST SYSTEM

START

S100 — START CONNECTION OPERATION

S101 — ATTEMPTING COMMUNICATION

S102 — IS IT POSSIBLE TO SELECT ANOTHER COMMUNICATION SPEED?
- YES → back to S101
- NO ↓

S103 — REQUEST DEVICE INFORMATION AND DFE LOG INFORMATION

S104 — IS ABNORMALITY BASED ON DEVICE INFORMATION DETECTED?
- YES → S105
- NO ↓

S105 — PREDETERMINED OPERATION

S106 — IS ABNORMALITY BASED ON DFE LOG INFORMATION DETECTED?
- YES → S107
- NO ↓

S107 — PREDETERMINED OPERATION

S108 — ESTABLISH CONNECTION

END

FIG. 7C
STORAGE DEVICE

START

S200 — START CONNECTION OPERATION

S201 — ADJUST PARAMETER

S202 — STORE DFE INFORMATION

S203 — IS ANOTHER COMMUNICATION SPEED SELECTED?
- YES → back to S201
- NO ↓

S204 — TRANSMIT DEVICE INFORMATION AND DFE LOG INFORMATION

S205 — ESTABLISH CONNECTION

END

FIG. 9A
USER TERMINAL DEVICE

START
↓
S301
DISPLAY RESULT
↓
S302
DISPLAY RESULT
↓
END

FIG. 9B
HOST SYSTEM

START
↓
S100 START CONNECTION OPERATION
↓
S101 ATTEMPTING COMMUNICATION
↓
S102 IS IT POSSIBLE TO SELECT ANOTHER COMMUNICATION SPEED? — YES → (back to S101)
↓ NO
S103 REQUEST DEVICE INFORMATION AND ERROR FREQUENCY INFORMATION
↓
S104 IS ABNORMALITY BASED ON DEVICE INFORMATION DETECTED? — YES → S105 PREDETERMINED OPERATION
↓ NO
S106 IS ABNORMALITY BASED ON ERROR FREQUENCY INFORMATION DETECTED? — YES → S107 PREDETERMINED OPERATION
↓ NO
S108 ESTABLISH CONNECTION
↓
END

FIG. 9C
STORAGE DEVICE

START
↓
S200 START CONNECTION OPERATION
↓
S201 ADJUST PARAMETER
↓
S202 STORE DFE INFORMATION
↓
S203 IS ANOTHER COMMUNICATION SPEED SELECTED? — YES → (back to S201)
↓ NO
S211 DETECT ERROR OCCURRENCE FREQUENCY
↓
S204 TRANSMIT DEVICE INFORMATION AND ERROR FREQUENCY INFORMATION
↓
S205 ESTABLISH CONNECTION
↓
END

FIG. 11A
USER TERMINAL DEVICE

START

S301
DISPLAY RESULT

S302
DISPLAY RESULT

END

FIG. 11B
HOST SYSTEM

START

S100 START CONNECTIONG OPERATION

S101 ATTEMPTING COMMUNICATION

S102 IS IT POSSIBLE TO SELECT ANOTHER COMMUNICATION SPEED? — YES → S101; NO → S103

S103 REQUEST DEVICE INFORMATION

S104 IS ABNORMALITY BASED ON DEVICE INFORMATION DETECTED? — YES → S105; NO

S105 PREDETERMINED OPERATION

S121 IS RECEIVING CIRCUIT ABNORMALITY INFORMATION RECEIVED? — YES → S107; NO

S107 PREDETERMINED OPERATION

S108 ESTABLISH CONNECTION

END

FIG. 11C
STORAGE DEVICE

START

S200 START CONNECTIONG OPERATION

S201 ADJUST PARAMETER

S202 STORE DFE INFORMATION

S203 IS ANOTHER COMMUNICATION SPEED SELECTED? — YES → S201; NO → S204

S204 TRANSMIT DEVICE INFORMATION

S211 DETECT ERROR OCCURRENCE FREQUENCY

S221 IS THERE ABNORMALITY IN RECEIVING CIRCUIT? — YES → S222; NO

S222 TRANSMIT RECEIVING CIRCUIT ABNORMALITY INFORMATION

S205 ESTABLISH CONNECTION

END

FIG. 13A
USER TERMINAL DEVICE

START

S302
DISPLAY RESULT

END

FIG. 13B
HOST SYSTEM

START

S150 NOTIFY STORAGE DEVICE OF REQUEST

S151 IS RECEIVING CIRCUIT ABNORMALITY INFORMATION INCLUDED IN RESPONSE INFORMATION?

YES → S107 PREDETERMINED OPERATION

NO

END

FIG. 13C
STORAGE DEVICE

START

S250 IS THERE ABNORMALITY IN RECEIVING CIRCUIT?

YES → S252 GENERATE RESPONSE INFORMATION INCLUDING RECEIVING CIRCUIT ABNORMALITY INFORMATION

NO → S251 GENERATE NORMAL RESPONSE INFORMATION

S253 TRANSMIT RESPONSE INFORMATION

END

STORAGE DEVICE, HOST SYSTEM, AND INFORMATION PROCESSING SYSTEM

CROSS-REFERENCE TO RELATED APPLICATION

This application is based upon and claims the benefit of priority from Japanese Patent Application No. 2017-171577, filed Sep. 6, 2017, the entire contents of which are incorporated herein by reference.

FIELD

Embodiments described herein relate generally to a storage device, a host system, and an information processing system.

BACKGROUND

A storage device includes a receiving circuit that receives a signal transmitted from a host system. In a case where an abnormality occurs in such a receiving circuit, a signal quality is degraded in some cases. Therefore, in a case where the abnormality occurs in the receiving circuit, it is desirable to be able to detect the abnormality.

DESCRIPTION OF THE DRAWINGS

FIG. 6 is a diagram illustrating an example of a content of log information of the first embodiment.

FIGS. 7A to 7C are flowcharts illustrating an example of a flow of processing of the information processing system of the first embodiment.

FIGS. 9A to 9C are flowcharts illustrating an example of a flow of processing of an information processing system of the second embodiment.

FIGS. 11A to 11C are flowcharts illustrating an example of a flow of processing of an information processing system of the third embodiment.

FIGS. 13A to 13C are flowcharts illustrating an example of a flow of processing of an information processing system of the fourth embodiment.

DETAILED DESCRIPTION

Figure 1:
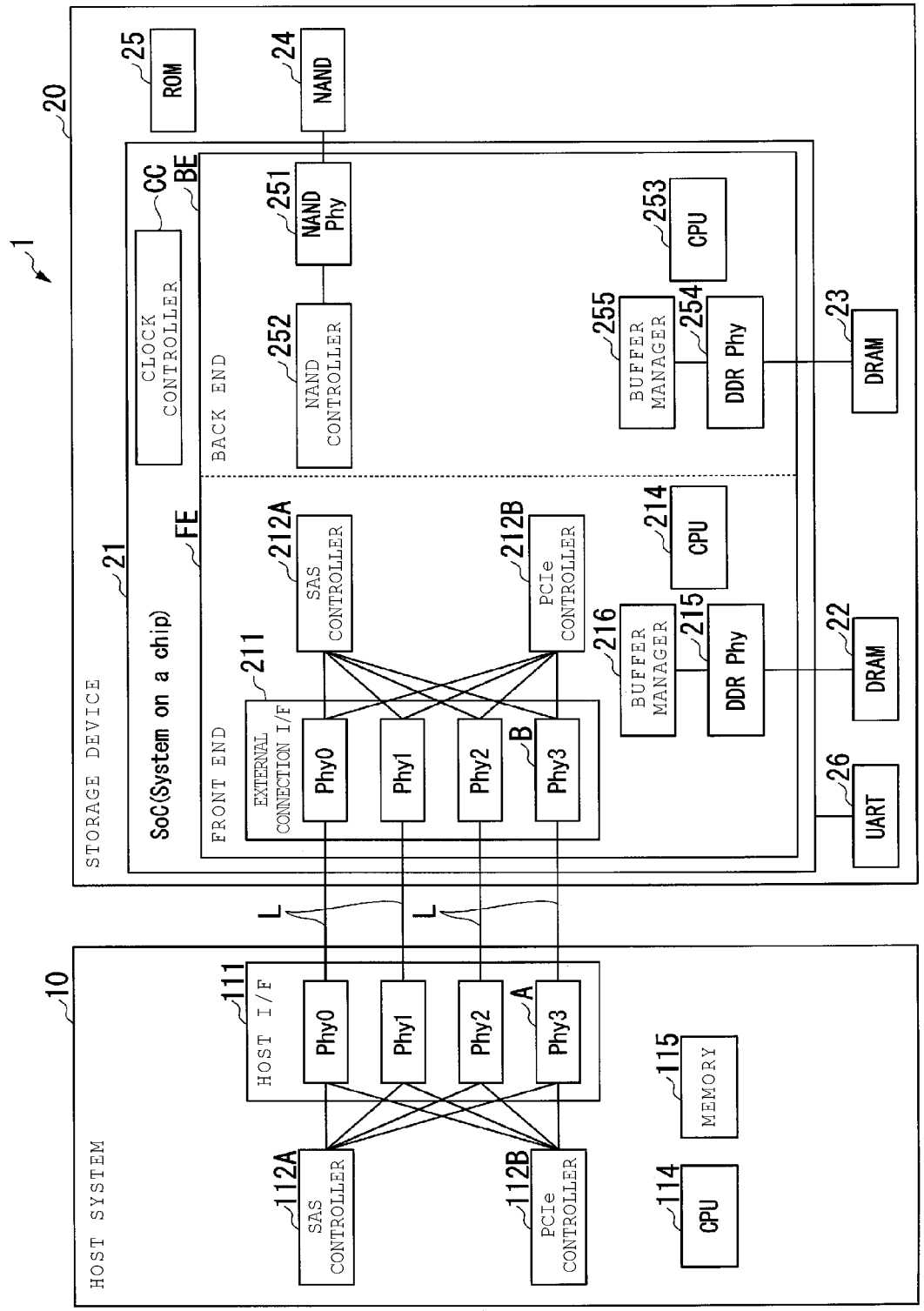
FIG. 1 is a block diagram illustrating an example of an information processing system of a first embodiment.

Embodiments provide a storage device, a host system, and an information processing system suitable for detecting an abnormality in a receiving circuit of the storage device.

In general, according to one embodiment, a storage device includes a receiving circuit including a correction circuit configured to correct an input signal from a host system based on correction factors and output the corrected input signal as an output signal containing a data value that is to be stored in the storage device, an interface controller configured to adjust the correction factors based on a difference value generated by the correction circuit using the output signal, and a transmission circuit configured to transmit the correction factors to the host system.

Hereinafter, a storage device, a host system, and an information processing system of embodiments will be described with reference to drawings. In the following description, components having the same or similar functions are given the same reference numerals. Overlapping descriptions of these configurations are omitted. In addition, a phase "based on XX" means that "based on at least XX" and includes a case where it is based on another element in addition to XX. In addition, the phrase "based on XX" is not limited to a case where XX is directly used, and also includes a case where it is based on the operation and processing performed on XX.

First Embodiment

First, a first embodiment will be described. The present embodiment is an example in which a storage device 20 transmits one or more parameter values of a DFE circuit 33 to a host system 10 and an abnormality determination of a receiving circuit of the storage device 20 is performed by the host system 10.

FIG. 1 is a block diagram illustrating an example of an information processing system 1 of the first embodiment. The information processing system 1 includes the host system 10 and the storage device 20. The host system 10 and the storage device 20 are connected to each other by using, for example, a serial attached small computer system interface (SCSI) (SAS) interface, and a PCI express (PCIe) interface. In the present embodiment, the SAS interface and the PCIe interface share four transmission lines L. However, the interface connecting the host system 10 and the storage device 20 may only be either the SAS interface or the PCIe interface. In addition, the interface connecting the host system 10 and the storage device 20 is not limited to the above example, and may be anon-volatile memory host controller interface (NVM Express (NVMe)) or the like.

Next, the host system 10 will be described. The host system 10 means a system to which the storage device 20 is connected. The host system 10 is a server device, a personal computer, or the like. For example, a plurality of storage devices 20 is connected to the host system 10. The host system 10 may be implemented by one device or may be implemented by a plurality of devices.

As illustrated in FIG. 1, the host system 10 includes, for example, a host interface 111, a SAS controller 112A, a PCIe controller 112B, a central processing unit (CPU) 114, and a memory 115.

The host interface 111 includes Phy0, Phy1, Phy2, and Phy3, which are interface circuits. Hereinafter, for convenience of description, each of Phy0 to Phy3 of the host interface 111 is referred to as "PhyA". The PhyA is a physical layer of the host interface 111 and a communication circuit of the host interface 111. The PhyA receives an electric signal transmitted from the storage device 20 through the transmission line L. The PhyA converts the received electrical signal into a digital signal. In addition, the PhyA converts the digital signal transmitted from the host system 10 into an electrical signal based on control of at least one of the SAS controller 112A and the PCIe controller 112B. The PhyA transmits the converted electrical signal to the storage device 20 through the transmission line L.

The SAS controller 112A and the PCIe controller 112B include a processor executing a program stored in program memory. However, all or a part of the SAS controller 112A and the PCIe controller 112B may be implemented in hardware (for example, as a large scale integration (LSI) circuit), an application specific integrated circuit (ASIC), a field-programmable gate array (FPGA), or the like.

The CPU 114 is an example of the "processor". The CPU 114 executes the program (for example, a firmware) stored in the memory 115 to control the host system 10.

Next, the storage device 20 will be described. The storage device 20 is a storage device to be used by the host system 10. The storage device 20 is equipped in, for example, a server device, a disk array, a personal computer, or the like. For example, the storage device 20 is part of an ECC group (error correction group) of redundant arrays of inexpensive disks (RAID) in the server device or the disk array. The storage device 20 is, for example, a solid state drive (SSD). However, the storage device is not limited thereto, and may be a hard disk drive (HDD) or the like.

As illustrated in FIG. 1, the storage device 20 includes, for example, a system on a chip (SoC) 21, a first dynamic random access memory (DRAM) 22, a second DRAM 23, a NAND 24, a read only memory (ROM) 25, and a universal asynchronous receiver/transmitter (UART) 26.

The SoC 21 includes, for example, a front end FE, a back end BE, and a clock controller CC. The clock controller CC supplies clock signals to the front end FE and the back end BE.

The front end FE of the SoC 21 includes, for example, an external connection interface 211, a SAS controller 212A, a PCIe controller 212B, a first CPU 214, a first DDR-Phy 215, and a first buffer manager 216.

The external connection interface 211 includes the Phy0, the Phy1, the Phy2, and the Phy3. Hereinafter, for convenience of description, each of Phy0 to Phy3 of the external connection interface 211 is referred to as "PhyA". The PhyB is a physical layer of the external connection interface 211 and a communication circuit of the external connection interface 211. The PhyB is an example of the "receiving circuit". The "receiving circuit" means a circuit to which a signal from another device, e.g., the host system 10, is input, and is not limited to a circuit having a specific function. The PhyB receives the electrical signal transmitted from the host system 10 through the transmission line L. The PhyB converts the received electrical signal into a digital signal. In addition, the PhyB converts the digital signal transmitted from the storage device 20 into an electrical signal based on control of at least one of the SAS controller 212A and the PCIe controller 212B. The PhyB transmits the converted electrical signal to the host system 10 through the transmission line L.

The SAS controller 212A and the PCIe controller 212B include a processor executing a program stored in program memory. However, all or a part of the SAS controller 212A and the PCIe controller 212B may be implemented in hardware (for example, as an LSI circuit), an ASIC, an FPGA, or the like.

The first CPU 214 executes a program (for example, the firmware) stored in the ROM 25 or the NAND 24 to control the front end FE. The first DDR-Phy 215 is a physical layer corresponding to the first DRAM 22. The first buffer manager 216 controls the first DDR-Phy 215 to perform storing data corresponding to the first DRAM 22 and reading data from the first DRAM 22.

The back end BE of the SoC 21 includes, for example, a NAND-Phy 251, a NAND controller 252, a second CPU 253, a second DDR-Phy 254, and a second buffer manager 255.

The NAND-Phy 251 is a physical layer corresponding to the NAND 24. The NAND controller 252 controls the NAND-Phy 251 to perform writing of data into the NAND 24 and reading of data from the NAND 24.

The second CPU 253 is an example of the "processor". The second CPU 253 executes the program (for example, a firmware) stored in the ROM 25 or the NAND 24 to control the back end BE. The second DDR-Phy 254 is a physical layer corresponding to the second DRAM 23. The second buffer manager 255 controls the second DDR-Phy 254 to perform storing data corresponding to the second DRAM 23 and reading data from the second DRAM 23.

Each of the first DRAM 22 and the second DRAM 23 is an example of a "volatile memory". Each of the first DRAM 22 and the second DRAM 23 functions as a data buffer in which data is temporarily stored. The first DRAM 22 and the second DRAM 23 may be implemented by one DRAM.

The NAND 24 is an example of a "nonvolatile memory". The NAND 24 is a main storage area of the storage device 20. The NAND 24 includes, for example, a plurality of NAND flash memory. The ROM 25 stores, for example, firmware and various management data items used for management of the storage device 20.

The UART 26 is an integrated circuit based on a start-stop synchronous communication. The UART 26 converts a serial signal into a parallel signal and a parallel signal into a serial signal. The UART 26 is used during debugging by a manufacturer of the storage device 20 or when a high-speed interface such as SAS or NVMe cannot be used during the manufacturing process of the storage device 20.

Next, the flow of signal correction in the host system 10 and the storage device 20 will be described with reference to FIG. 2. "Signal correction" means changing the waveform of a signal. Hereinafter, an example in which the host system 10 is a signal transmission side and the storage device 20 is a signal reception side will be described.

Figure 2:
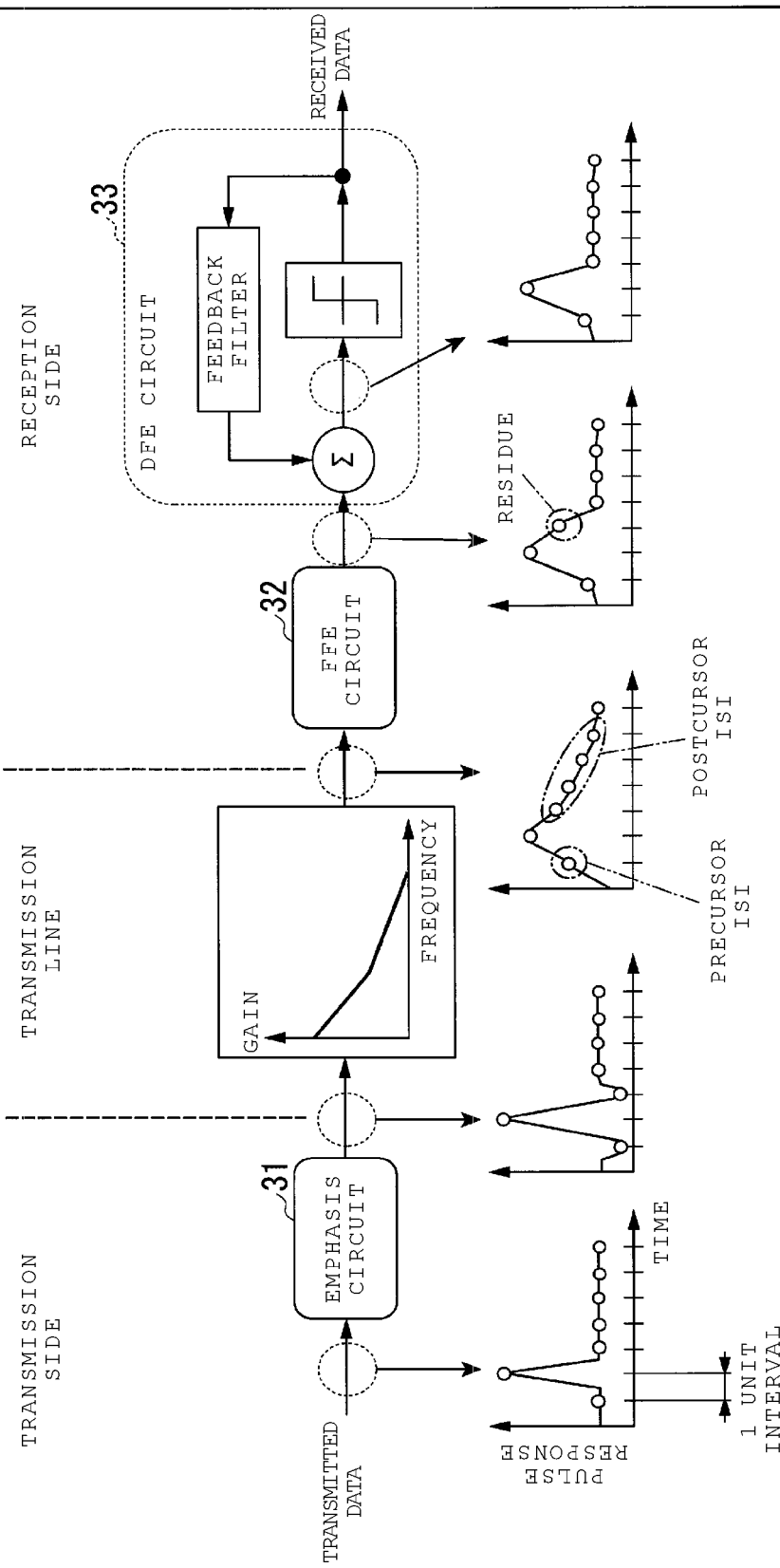
FIG. 2 is a conceptual diagram illustrating a flow of a signal correction in a host system and a storage device of the first embodiment.

FIG. 2 is a diagram illustrating a flow of a signal correction in the host system 10 and the storage device 20. PhyA of the host system 10 includes an emphasis circuit 31. The emphasis circuit 31 is, for example, a pre-emphasis circuit or a de-emphasis circuit. The emphasis circuit 31 performs adjustment for preventing inter-symbol interference (ISI) with respect to a signal in advance. The signal adjusted by the emphasis circuit 31 is sent to the transmission line L. The signal waveform of the signals sent to the transmission line L is distorted in the course of passing through the transmission line L.

The Phy B of the storage device 20 includes a feed forward equalization (FFE) circuit 32 and a decision feedback equalization (DFE) circuit 33. The FFE circuit 32 and the DFE circuit 33 correct the signal that has been distorted in the course of passing through the transmission line L. Specifically, the signal passed through the transmission line L is input to the FFE circuit 32. The FFE circuit 32 corrects the signal, based on parameters stored in a parameter holding unit 34, so as to prevent the floating of a precursor ISI and a postcursor ISI. The signal corrected by the FFE circuit 32 is input to the DFE circuit 33. The DFE circuit 33 corrects the signal so as to reduce a residue in the vicinity of the pulse response, making it easy to determine the signal level. The DFE circuit 33 is an example of a "decision feedback equalizer".

Figure 3:
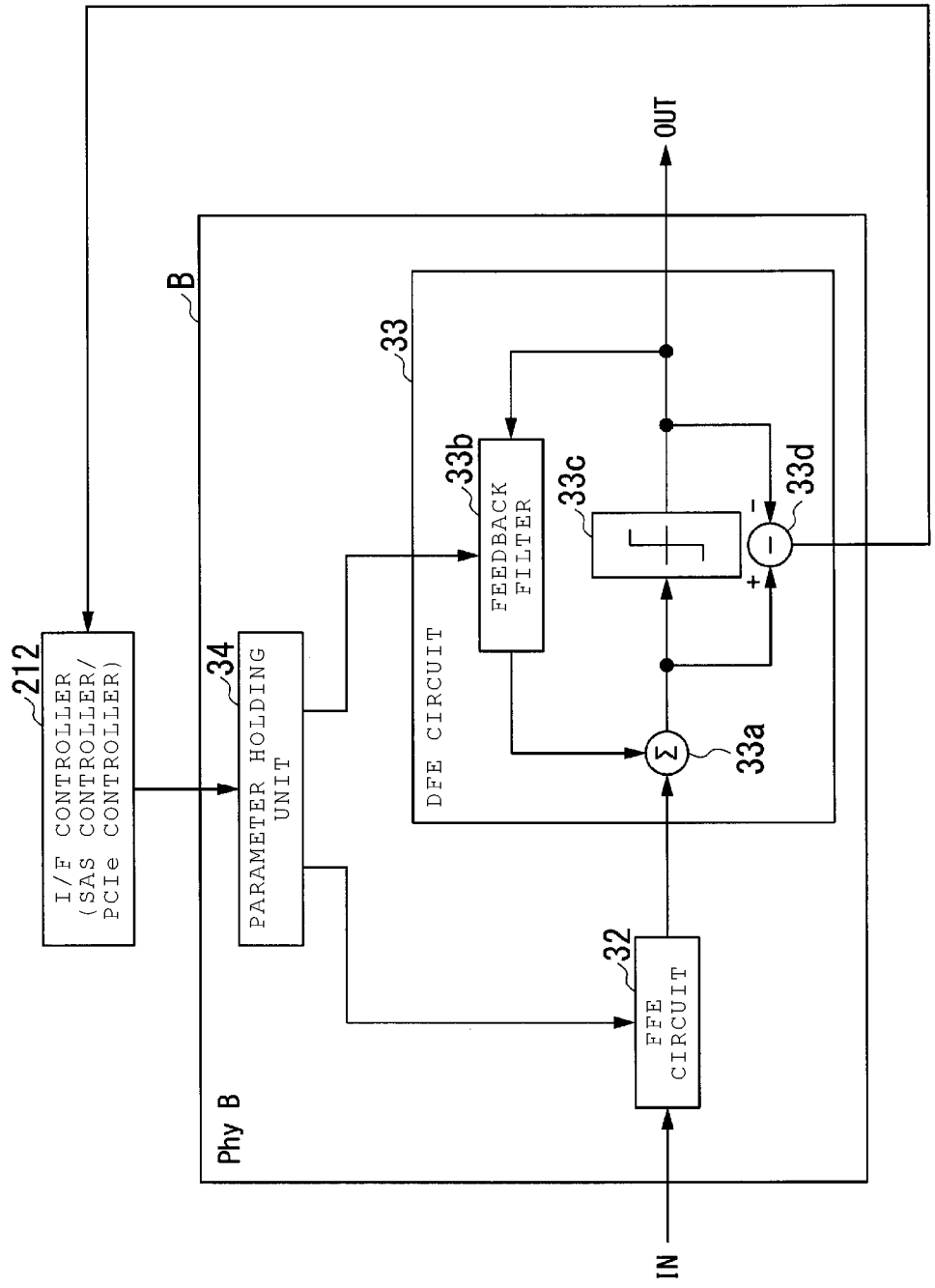
FIG. 3 is a block diagram illustrating a part of a configuration of an interface circuit of the first embodiment.

Next, the parameter of the DFE circuit 33 will be described with reference to FIGS. 3 and 4. FIG. 3 is a block diagram illustrating a part of the PhyB. Hereinafter, the SAS controller 212A and the PCIe controller 212B will be generically referred to as an "I/F controller 212".

As illustrated in FIG. 3, the PhyB includes, for example, the FFE circuit 32, the DFE circuit 33, and the parameter holding unit 34. The DFE circuit 33 includes, for example, an integrator 33a, a feedback filter 33b, a comparator 33c, and a subtractor 33d. The integrator 33a adds the signal input from the FFE circuit 32 to the DFE circuit 33 and the signal returned from the feedback filter 33b. The comparator 33c determines the signal level closest to the signal output from the integrator 33a, and converts the signal waveform into a data value. The comparator 33c outputs the converted data value as the output of the DFE circuit 33. The subtractor 33d measures a difference in signal level between the signal input from the integrator 33a to the comparator 33c and the signal output from the comparator 33c and outputs the difference between the detected signal levels to the I/F controller 212. The I/F controller 212 adjusts one or more parameters C0 to CN used in the feedback filter 33b so that the difference between the signal levels detected by the subtractor 33d becomes 0. The adjusted parameters C0 to CN are stored in the parameter holding unit 34.

Figure 4:
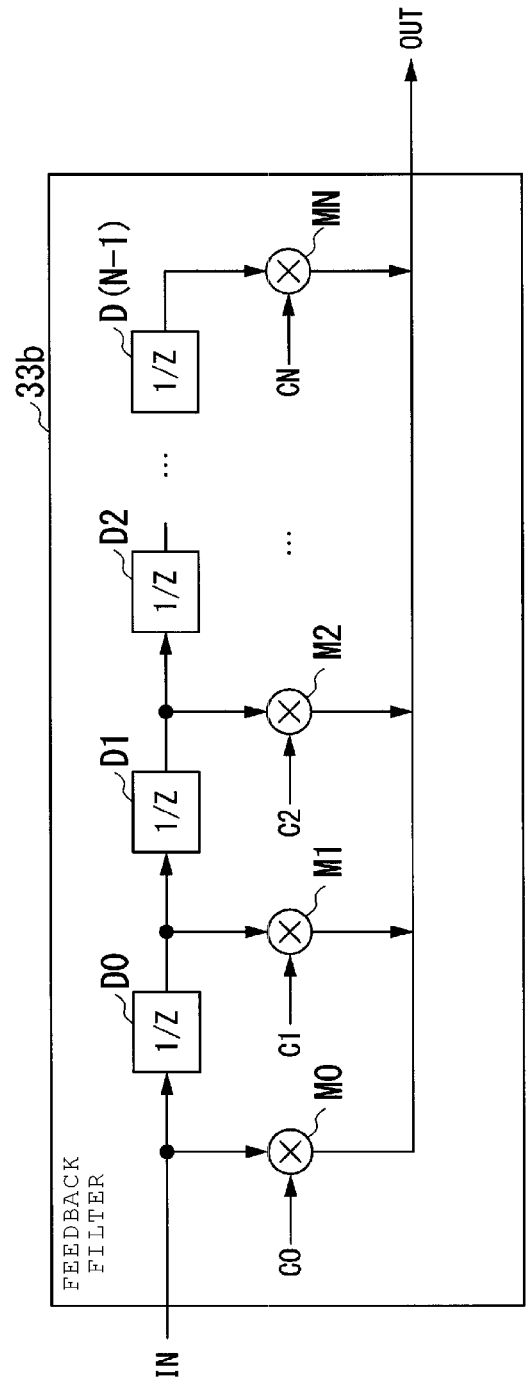
FIG. 4 is a block diagram illustrating an example of a feedback filter in the interface circuit.

FIG. 4 is a block diagram illustrating an example of a feedback filter 33b. The feedback filter 33b includes, for example, multipliers M1 to MN and delay units D0 to D(N−1). The multipliers M1 to MN multiply the delay data processed by the delay units D0 to D(N−1) by the parameters C0 to CN, respectively. The individual results multiplied by using the multipliers M1 to MN are output from the feedback filter 33b and input to the integrator 33a of the DFE circuit 33. Each of the parameters C0 to CN is an example of "parameters used for signal correction". Each of the parameters C0 to CN may be referred to as "correction coefficient", "tap coefficient", "coefficient", or "received signal correction information". The value of each of the parameters C0 to CN is changed under the control of the I/F controller 212.

Next, a functional configuration relating to abnormality detection of the receiving circuit of the storage device 20 will be described. In the present embodiment, the storage device 20 outputs log information LI indicating a history of the values of the parameters C0 to CN of the DFE circuit 33 as an example of the information on the state of the receiving circuit to the host system 10. The host system 10 performs determination of abnormality in the receiving circuit of the storage device 20 based on the log information LI (which indicates the history of the values of the parameters C0 to CN of the DFE circuit 33) acquired from the storage device 20.

Figure 5:
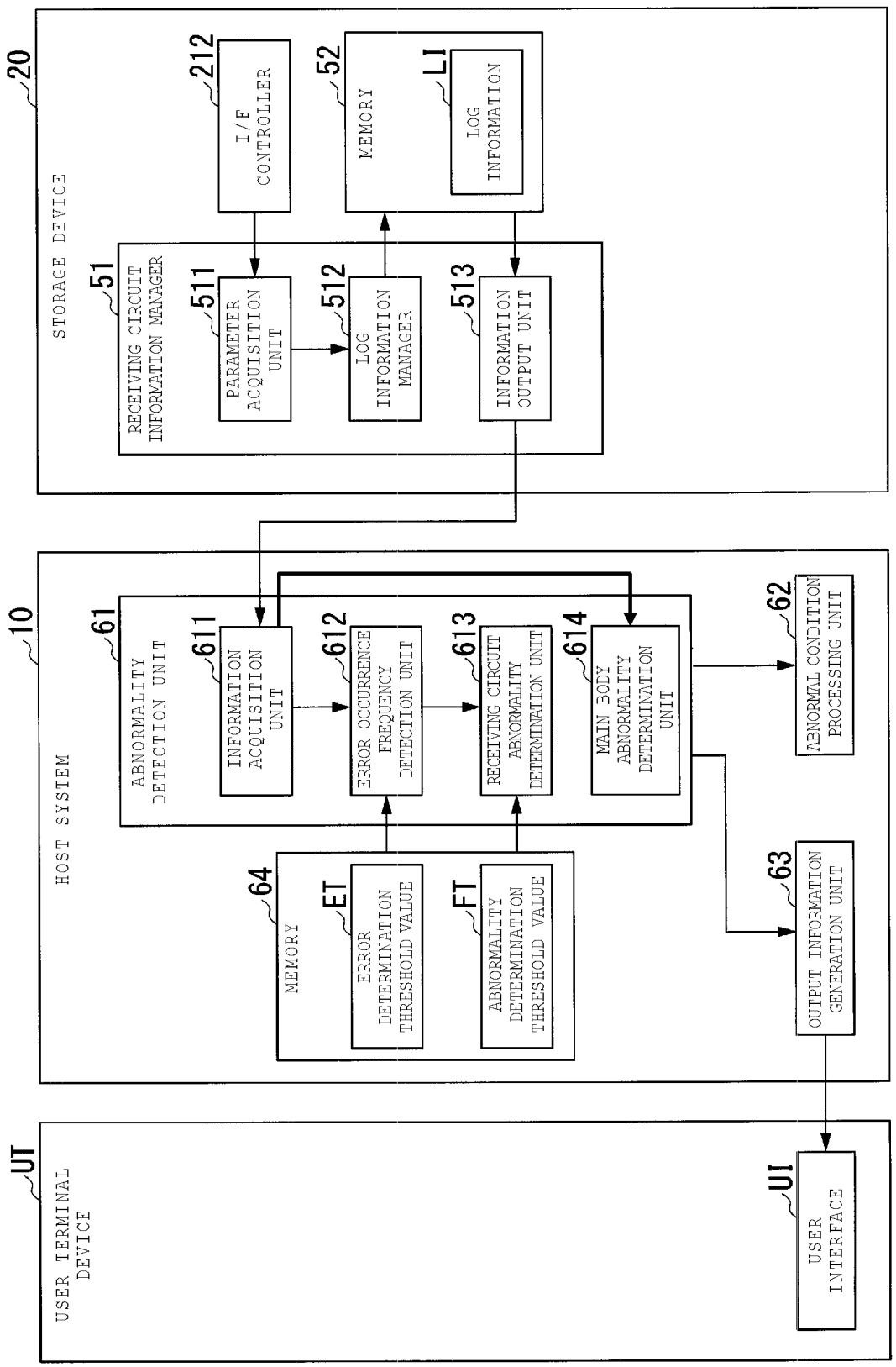
FIG. 5 is a block diagram illustrating a functional configuration of a part of each of the host system, the storage device, and a user terminal device of the first embodiment.

FIG. 5 is a block diagram illustrating a functional configuration of a part of each of the storage device 20, the host system 10, and a user terminal device UT.

First, the functional configuration of the storage device 20 will be described. The storage device 20 includes, for example, a receiving circuit information manager 51, an I/F controller 212, and a memory 52. The receiving circuit information manager 51 is realized, for example, by the first CPU 214 executing a program (for example, the firmware) stored in the ROM 25. However, all or a part of the receiving circuit information manager 51 may be implemented in hardware (for example, an LSI circuit), an ASIC, an FPGA, or the like. The memory 52 may be a storage area provided inside the SoC 21 or may be the first DRAM 22 or the second DRAM 23, or the NAND 24.

The receiving circuit information manager 51 includes, for example, a parameter acquisition unit 511, a log information manager 512, and an information output unit 513.

The parameter acquisition unit 511 acquires the values of the parameters C0 to CN of the DFE circuit 33 adjusted by the I/F controller 212. For example, the parameter acquisition unit 511 may acquire the values of the parameters C0 to CN by receiving the values of the parameters C0 to CN from the I/F controller 212, or may acquire the values of the parameters C0 to CN by reading out the values of the parameters C0 to CN from the parameter holding unit 34. For example, the parameter acquisition unit 511 acquires the values of the parameters C0 to CN each time the values of the parameters C0 to CN are adjusted (changed). The parameter acquisition unit 511 outputs the values of the acquired parameters C0 to CN to the log information manager 512 each time the parameter acquisition unit 511 acquires the values of the parameters C0 to CN.

The log information manager 512 receives the values of the parameters C0 to CN from the parameter acquisition unit 511. The log information manager 512 registers the values of the parameters C0 to CN received from the parameter acquisition unit 511 in the log information LI held in the memory 52. The "log information" is information including values measured or registered at a plurality of points in time and is not limited to items of a specific format or including specific information. For example, the log information manager 512 appends the values of the received parameters C0 to CN to the log information LI each time when the log information manager 512 receives the values of the parameters C0 to CN from the parameter acquisition unit 511. As a result, the log information manager 512 manages the history of the parameters C0 to CN as the log information LI. An example of the log information LI will be described below with reference to FIG. 6.

In a case where the host system 10 notifies the storage device 20 of a request for the log information LI, the information output unit 513 reads out the log information LI from the memory 52 and transmits the read log information LI to the host system 10. Further, the information output unit 513 may transmit the log information LI to the host system 10 at a predetermined cycle regardless of the request from the host system 10.

Next, the functional configuration of the host system 10 will be described. The host system 10 includes, for example, an abnormality detection unit 61, an abnormal condition processing unit 62, an output information generation unit 63, and a memory 64. The abnormality detection unit 61, the abnormal condition processing unit 62, and the output information generation unit 63 are realized by the CPU 114 executing the program stored in a memory 115 (see FIG. 1). However, all or a part of the abnormality detection unit 61, the abnormal condition processing unit 62, and the output information generation unit 63 may be implemented in hardware (for example, an LSI circuit), an ASIC, an FPGA, or the like. The memory 64 may be a DRAM mounted in the host system 10 or may be another memory device.

In a case where an abnormality occurs in the PhyB of the storage device 20, the abnormality detection unit 61 detects an abnormality in the PhyB based on the values of the parameters C0 to CN of the DFE circuit 33 included in the log information LI. Specifically, the abnormality detection unit 61 includes, for example, an information acquisition unit 611, an error occurrence frequency detection unit 612, a receiving circuit abnormality determination unit 613, and a main body abnormality determination unit (for example, an abnormality determination unit based on information such as S.M.A.R.T. (defined below)) 614.

The information acquisition unit 611 transmits a request for the log information LI to the storage device 20. For example, the information acquisition unit 611 notifies the storage device 20 of a request to transmit the log information LI during the connection operation (i.e., between connection start and connection establishment) between the host system 10 and the storage device 20. Further, the information acquisition unit 611 notifies the storage device 20 of the request to transmit the log information LI at a predetermined cycle in a state where the connection between the host system 10 and the storage device 20 is established (e.g., while the storage device 20 is operated). In a case where the log information LI is transmitted from the storage device 20, the information acquisition unit 611 acquires the transmitted log information LI. The information acquisition unit 611 outputs the acquired log information LI to the error occurrence frequency detection unit 612.

The error occurrence frequency detection unit 612 performs error determination relating to the parameters C0 to CN based on the values of the parameters C0 to CN included in the log information LI and the error determination threshold value ET read from the memory 64, and measures the error occurrence frequency. The "error determination" means determination whether an error occurs. Here, in a case where an abnormality occurs in the PhyB and the signal attenuates, the values of the parameters C0 to CN are lower than that in the normal case. In addition, in a case where the abnormality occurs in the PhyB and there is distortion in the shape of the signal, a magnitude ratio between the values of the plurality of parameters C to CN is greater (or smaller) than that in the normal case. The "error" means that the value obtained from the values of the parameters C0 to CN, or the values of the parameters C0 to CN are outside a predetermined range of the normal values. In the present embodiment, in a case where the values of one or more parameters C0 to CN are outside one or more normal ranges of the one or more parameters C0 to CN, or in a case where one or more ratios between the values of a plurality of parameters C0 to CN are outside one or more normal ranges of the one or more ratios, it is determined that there is an error.

In the present embodiment, the error determination threshold value ET includes first threshold values ET1-0 to ET1-N that are upper limit values of the normal range set corresponding to each of the parameters C0 to CN, and second threshold values ET2-0 to ET2-N that are lower limit values of the normal range. In a case where the values of one or more parameters C0 to CN are greater than the first thresholds ET1-0 to ET1-N set corresponding to the parameters C0 to CN, respectively, or smaller than the second thresholds ET 2-0 to ET2-N set corresponding to the parameters C0 to CN, the error occurrence frequency detection unit 612 determines that there is an error.

In addition, the error determination threshold value ET includes third threshold values ET3-0 to ET3-M that are upper limit values of the normal range set corresponding to each of the magnitude ratio between the values of the plurality of parameters C0 to CN, and fourth threshold values ET4-0 to ET4-M that are lower limit values of the normal range. In a case where the one or more ratios between the values of the plurality of parameters C0 to CN are greater than the third threshold values ET3-0 to ET3-M set corresponding to each of the ratios between the values of the plurality of parameters C0 to CN, or are smaller than the fourth threshold values ET4-0 to ET4-M set corresponding to each of the ratios between the values of the plurality of parameters C0 to CN, the error occurrence frequency detection unit 612 determines that there is an error.

In the present embodiment, the error occurrence frequency detection unit 612 performs error determination on the values of the parameters C0 to CN at each of a plurality of points of time in the log information LI. Then, the error occurrence frequency detection unit 612 counts the number of occurrences of errors during a predetermined period included in the log information LI, and detects the occurrence frequency of errors in the predetermined period based on the number of occurrences of the counted errors. The "error occurrence frequency" is, for example, the number of occurrences of errors divided by unit time. The error occurrence frequency detection unit 612 outputs information indicating the occurrence frequency of the detected error to the receiving circuit abnormality determination unit 613.

The error determination operation by the error occurrence frequency detection unit 612 is not limited to the above example. The error occurrence frequency detection unit 612 may perform error determination based on only one of the values of the parameters C0 to CN and the ratio between the values of the plurality of parameters C0 to CN.

Alternatively or additionally, the error occurrence frequency detection unit 612 may perform the error determination as the error determination method based on the values of the parameters C0 to CN at a first time point included in the log information LI and a changed amount between the values of parameters C0 to CN at a second time point that is after the first time point. In this case, in a case where the changed amount of one or more of the parameters C0 to CN is greater than the fifth threshold values ET5-0 to ET5-N set corresponding to the parameters C0 to CN, respectively, the error occurrence frequency detection unit 612 may determine that there is an error.

The error determination threshold values ET (each of the first threshold value ET1-0 to ET1-N, the second threshold value ET2-0 to ET2-N, the third threshold value ET3-0 to ET3-M, the fourth threshold value ET4-0 to ET4-M, and the fifth threshold values ET5-0 to ET5-N) are set to different values for each communication speed between the host system 10 and the storage device 20. Hereinafter, in a case where simply described as "communication speed", it means the communication speed between the host system 10 and the storage device 20. The error occurrence frequency detection unit 612 changes the error determination threshold value ET to be used according to the communication speed.

The error occurrence frequency detection unit 612 may output the information indicating the number of occurrences of errors in the predetermined period instead of the occurrence frequency of errors to the receiving circuit abnormality determination unit 613. Therefore, all of the phases "error occurrence frequency" in the following description may be read as the "number of occurrences of error".

The receiving circuit abnormality determination unit 613 determines abnormality in the Phy B of the storage device 20 based on the occurrence frequency of the error detected by the error occurrence frequency detection unit 612 and an abnormality determination threshold value FT read out from the memory 64. The "abnormality determination" means a determination as to whether or not it is abnormal. For example, in a case where the occurrence frequency of the error is greater than the abnormality determination threshold value FT, the receiving circuit abnormality determination unit 613 determines that the PhyB of the storage device 20 is abnormal. In a case where it is determined that the PhyB of the storage device 20 is abnormal, the receiving circuit abnormality determination unit 613 outputs a signal indicating that there is an abnormality in the PhyB to the abnormal condition processing unit 62 and the output information generation unit 63.

The main body abnormality determination unit 614 determines abnormality in the storage device 20 based on main body information of the storage device 20. The "main device information of the storage device" is, for example, information included in at least one of a self-monitoring analysis and reporting technology (S.M.A.R.T.), a "Mode Page" in the SAS, the "feature" in NVMe, "Log Page" in the SAS, "Get Log" in NVMe, and is information on various controllers provided in the SoC 21 or information on the state of the NAND 24 or the like. The "abnormality in the storage device" is, for example, a fault listed as an item of S.M.A.R.T., and is an abnormality in a portion other than PhyB. For example, the "abnormality in the storage device" is an abnormality related to various controllers provided in the SoC 21, the NAND 24, or the like.

In a case where the receiving circuit abnormality determination unit 613 determines that there is an abnormality in the PhyB or in a case where the main body abnormality determination unit 614 determines that there is an abnormality in the storage device 20, the abnormal condition processing unit 62 performs a predetermined operation for causing the information processing system 1 to transition to the safe side. For example, in a case where the receiving circuit abnormality determination unit 613 or the main body abnormality determination unit 614 determines that there is an abnormality at the time of connection operation between the host system 10 and the storage device 20, the abnormal condition processing unit 62 "releases the connection state" between the host system 10 and the storage device 20. It should be noted that "releasing the connection state" does not mean releasing the physical connection state. Instead, it means that the host system 10 does not recognize the storage device 20 that has been determined to be abnormal, as a regular storage device.

In a case where the receiving circuit abnormality determination unit 613 determines that there is an abnormality in the PhyB in a state where the host system 10 and the storage device 20 are connected to each other (e.g., in a state where the storage device 20 is operated), or in a case where when the main body abnormality determination unit 614 determines that there is an abnormality in the storage device 20, the abnormal condition processing unit 62 performs a predetermined operation for causing the information processing system 1 to transition to the safe side. For example, as an example of the predetermined operation, the abnormal condition processing unit 62 performs at least one of the following operations: operation to stop the storage device 20, operation to prevent processing on the storage device 20, and operation to "release the connection state" of the host system 10 and the storage device 20. The "operation to stop" means, for example, stopping writing and reading of data to and from the storage device 20 determined to have an abnormality. The "operation to prevent processing" means, for example, allowing reading of data from the storage device 20 that is determined to have an abnormality, but not allowing writing of data thereto, or to use a storage device different from the storage device that is determined to have an abnormality.

In a case where the receiving circuit abnormality determination unit 613 determines that there is an abnormality in the PhyB or in a case where the main body abnormality determination unit 614 determines that there is an abnormality in the storage device 20, the output information generation unit 63 generates the predetermined information output to a user interface UI. The predetermined information includes, for example, that an abnormality is detected in the storage device 20 (for example, an abnormality is detected in the PhyB), that a predetermined operation for causing the information processing system 1 to transition to the safe side is performed, and information for notifying the user of a notification prompting maintenance of the storage device 20.

The user terminal device UT is an information processing device used by a user, and is, for example, a personal computer or a server device. The user terminal device UT has a user interface UI. The user interface UI includes a display device with a display screen. The user interface UI receives the predetermined information output from the output information generation unit 63 and displays the received predetermined information on the display screen.

FIG. 6 is a diagram illustrating an example of a content of the log information LI. The log information LI is information in which the connection state between the host system 10 and the storage device 20 and the parameters C0 to CN of the DFE circuit 33 are associated with each other at each of a plurality of time points. By using such log information LI, abnormality determination of the PhyB can be performed by considering not only the most recent parameters C0 to CN but also past parameters C0 to CN.

Next, the flow of processing of the information processing system 1 will be described. FIGS. 7A to 7C are flowcharts illustrating an example of a flow of processing of the information processing system 1. FIGS. 7A to 7C relate to a flow of processing for determining an abnormality in the storage device 20 at the time of connection operation between the host system 10 and the storage device 20. FIG. 7A illustrates the operation of the user terminal device UT. FIG. 7B illustrates the operation of the host system 10. FIG. 7C illustrates the operation of the storage device 20.

Abnormal Determination when Connection Operation (between Connection Start and Connection Establishment)

As shown in FIGS. 7A to 7C, first, the host system 10 and the storage device 20 start the connection operation (S100 and S200). This connection operation is a series of operations called a link reset sequence in the case of SAS, for example. This connection operation is started when a predetermined signal (for example, an out of band (OOB) signal in the SAS) is transmitted and received between the host system 10 and the storage device 20.

Next, the host system 10 and the storage device 20 perform processing (for example, speed negotiation in the SAS) for determining the communication speed (link rate). More specifically, the host system 10 selects one communication speed (for example, the slowest communication speed) from among selectable communication speeds and attempts communication with the storage device 20 at the selected communication speed (S101). For example, the host system 10 attempts to exchange a predetermined pattern with the storage device 20 at the selected communication speed. In the case of the SAS, the predetermined pattern is a pattern called "ALIGN" at 1.5 Gbps and 3 Gbps, a pattern called "Phy Capability" at 6 Gbps, and a pattern called "Trainpattern/Train Done Pattern" at 12 Gbps. In a case where the signal is received at the communication speed selected by the host system 10, the storage device 20 adjusts the parameters C0 to CN of the DFE circuit 33 according to the communication speed (S201). When adjusting the parameters C0 to CN of the DFE circuit 33, the storage device 20 stores the adjusted parameters C0 to CN (denoted as "DFE information" in FIGS. 7A to 7C) in the memory 52 as part of the log information LI (S202).

Next, the host system 10 determines whether it is possible to select another communication speed (for example, one speed faster than the previous communication) (S102). In a case where the other communication speed can be selected (S102: YES), the host system 10 repeats the processing in S101 at a newly selected communication speed. The storage device 20 determines whether the host system 10 selected the other communication speed based on a signal received from the host system 10 (S203). In a case where the host system 10 selects the other communication speed (S203: YES), the storage device 20 repeats the processing in S201 and S202 at the newly selected communication speed. As a result, the history of the parameters C0 to CN of the DFE circuit 33 at a plurality of time points is stored as the log information LI.

The host system 10 and the storage device 20 perform the processing in S101 and S102, and S201 to S203 at a plurality of communication speeds. Ina case where all the communication speeds supported by the storage device 20 have been selected (that is, in a case where another communication speed cannot be selected) (S102: NO), the host system 10 ends adjustment of the communication speed. Then, the host system 10 is connected to the storage device 20 at the highest communication speed at which the exchange of the predetermined pattern was successful (valid). The host system 10 may determine whether it is possible to establish connection at a slower communication speed one step at a time starting from the fastest speed instead of determining whether it is possible to establish connection at a higher communication speed one step at a time starting from the slowest speed.

Next, the host system 10 notifies the storage device 20 of the request to transmit the main body information and the log information LI ("device information" and "DFE log information" in FIGS. 7A to 7C, respectively) of the storage device 20 (S103). In a case of receiving the request from the host system 10, the storage device 20 transmits the main body information of the storage device 20 and the log information LI to the host system 10 (S204). Transmission of the main body information and the log information LI of the storage device 20 is normally performed using the SAS interface, the PCIe interface, or the like. In a case where these connections are difficult (for example, when a selection timeout occurs), the UART 26 may be used.

Next, the main body abnormality determination unit 614 of the host system 10 determines whether the abnormality is detected based on the main body information of the storage device 20 (S104). Then, in a case where an abnormality is detected based on the main body information of the storage device 20 (S104: YES), the abnormal condition processing unit 62 performs a predetermined operation to transition the information processing system 1 to the safe side (S105). Specifically, the abnormal condition processing unit 62 releases the connection state between the host system 10 and the storage device 20.

In a case where the abnormality is detected based on the main body information of the storage device 20, the output information generation unit 63 of the host system 10 generates information to be informed to the user that the abnormality in the storage device 20 is detected and the predetermined operation to transition the information processing system 1 to the safe side is performed and transmits the generated information to the user terminal device UT. The user terminal device UT displays the information transmitted from the output information generation unit 63 on the user interface UI (S301).

On the other hand, in a case where the abnormality is not detected based on the main body information of the storage device 20 (S104: NO), the receiving circuit abnormality determination unit 613 of the host system 10 determines whether the abnormality is detected in the PhyB based on the log information LI (S106). In a case where the abnormality is detected based on the log information LI (S106: YES), the abnormal condition processing unit 62 performs a predetermined operation to transition the information processing system 1 to the safe side (S107). Specifically, the abnormal condition processing unit 62 releases the connection state between the host system 10 and the storage device 20.

In a case where the abnormality is detected based on the log information LI, the output information generation unit 63 of the host system 10 generates information to notify to the user that the abnormality has been detected in the PhyB of the storage device 20, and of the predetermined operation to transition the information processing system 1 to the safe side, and transmits the generated information to the user terminal device UT. The user terminal device UT displays the information transmitted from the output information generation unit 63 on the user interface UI (S302).

On the other hand, in a case where the abnormality is not detected based on the log information LI (S106: NO), the host system 10 and the storage device 20 establish the connection between the host system 10 and the storage device 20 (S108 and S205).

Abnormality Determination after Connection Establishment (Operation of Storage Device)

Next, the abnormality determination of the storage device 20 after connection establishment between the host system 10 and the storage device 20 will be described. Since this process is substantially the same as the process after S103 at the time of the connection operation described above, an illustration of the flowchart is omitted.

Specifically, after connection establishment between the host system 10 and the storage device 20, the host system 10 repeats processing in S103, S104, and S106 illustrated in FIGS. 7A to 7C at a predetermined cycle. In a case where the abnormality is detected in the processing in S104 or S106, a predetermined operation (processing in S105 and S107) to transition the information processing system 1 to the safe side is performed. Here, in a case where the connection between the host system 10 and the storage device 20 is already established, the predetermined operation is one of the operation to stop the storage device 20, an operation to prevent processing on the storage device 20, and an operation to release the connection state of the host system 10 and the storage device 20.

In some embodiments, the host system 10 may be configured to perform only one of "abnormality determination at the time of connection operation" and "abnormality determination after connection establishment".

According to such a configuration, the storage device 20, the host system 10, and the information processing system 1 suitable for detecting the abnormality in the receiving circuit of the storage device 20 can be provided. For example, in a case where there is the abnormality in the receiving circuit, signal quality degradation (for example, increase in the ISI or decrease in received signal amplitude) may occur. For example, as the speed of the interface is faster, the greater the signal degradation in a case where the abnormality occurs in the receiving circuit.

In the present embodiment, the storage device 20 includes the information output unit 513 that outputs the information on the state of the PhyB to the host system 10. Accordingly, it is possible to perform the abnormality determination relating to the PhyB by the host system 10, and the abnormality in the PhyB can be detected early. As a result, it is possible to more reliably prevent the possibility of occurrence of a system failure, or the like by operating the storage device 20 where signal quality is not good due to failure or the like. Accordingly, it is possible to improve the reliability of the storage device 20 and the information processing system 1.

In the present embodiment, the storage device 20 outputs the values of the one or more parameters C0 to CN of the DFE circuit 33 provided in the PhyB as the information on the state of the receiving circuit. According to such a configuration, the host system 10 can perform the abnormality determination of the PhyB based on the values of the one or more parameters C0 to CN of the DFE circuit 33. Accordingly, the abnormality in the PhyB can be detected with higher accuracy.

Here, the current values of the parameters C0 to CN of the DFE circuit 33 are not the only values that are determined to be within the normal range. Therefore, in a case where the abnormality determination is performed based on the values of the parameters C0 to CN of the DFE circuit 33, it is preferable to perform the abnormality determination also in consideration of the history of the values of the parameters C0 to CN of the DFE circuit 33.

In the present embodiment, the storage device 20 includes the log information manager 512 that manages the history of the values of the one or more parameters of the DFE circuit 33 as the log information LI. The storage device 20 outputs the log information LI to the host system 10. According to such a configuration, the host system 10 can perform the abnormality determination based on the history of the values of the parameters C0 to CN of the DFE circuit 33 obtained from the log information LI. Accordingly, the abnormality in the PhyB can be detected further higher accuracy.

In the present embodiment, the host system 10 detects the frequency or the number of times that the value of one or more parameters C0 to CN of the DFE circuit 33 deviates from the normal range, and in a case where the frequency or the number of times that the value of the one or more parameters C0 to CN deviates from the normal range is greater than the threshold value, determines that there is the abnormality in the PhyB. According to such a configuration, the abnormality determination can be performed also in consideration of how often the values of the parameters C0 to CN of the DFE circuit deviates from the normal range. Accordingly, the abnormality in the PhyB can be detected further higher accuracy.

In the present embodiment, in a case where it is determined that there is the abnormality in the PhyB at the time of connection operation between the host system 10 and the storage device 20, the abnormal condition processing unit 62 of the host system 10 releases the connection state between the host system 10 and the storage device 20. According to such a configuration, in a case where the abnormality occurs in the PhyB, by releasing the connection state between the host system 10 and the storage device 20, the information processing system 1 can be shifted to the safe side. Accordingly, the reliability of the information processing system 1 can be further enhanced.

In the present embodiment, in a case where the abnormality determination relating to the PhyB is performed at a certain cycle and it is determined that there is the abnormality in the PhyB in a state where the host system 10 is connected to the storage device 20, the abnormal condition processing unit 62 of the host system 10 performs at least one of an operation to stop the storage device 20, an operation to prevent processing on the storage device 20, and an operation to release the connection state of the host system 10 and the storage device 20. According to such a configuration, even in a case where the failure occurs in the PhyB during the operation of the storage device 20, the information processing system 1 can be shifted to the safe side. Accordingly, the reliability of the information processing system 1 can be further enhanced.

Modification Example

In the first embodiment, an example that the error occurrence frequency relating to the parameters C0 to CN of the DFE circuit 33 based on the log information LI is detected and the abnormality determination is performed based on the error occurrence frequency is described. However, the abnormality determination may be performed directly based on the values of the parameters C0 to CN of the DFE circuit 33, not based on the error occurrence frequency. This content will be described in the present modification example.

In the present modification example, the abnormality determination threshold value FT includes first threshold values FT1-0 to FT1-N that are upper limit values of the normal range (the predetermined range) set corresponding to each of the parameters C0 to CN of the DFE circuit 33, and second threshold values FT2-0 to FT2-N that are lower limit values of the normal range. In a case where the values of one or more parameters C0 to CN are greater than the first thresholds FT1-0 to FT1-N set corresponding to the parameters C0 to CN, respectively, or smaller than the second thresholds FT 2-0 to FT2-N set corresponding to the parameters C0 to CN, the receiving circuit abnormality determination unit 613 determines that there is an abnormality in the PhyB.

In addition, the abnormality determination threshold value FT includes third threshold values FT3-0 to FT3-M that are upper limit values of the normal range set corresponding to each of the magnitude ratio between the values of the plurality of parameters C0 to CN, and fourth threshold values FT4-0 to FT4-M that are lower limit values of the normal range. In a case where the one or more ratios of a value between the plurality of parameters C0 to CN are greater than the third threshold values FT3-0 to FT3-M set corresponding to each of the ratios between the plurality of parameters C0 to CN, or are smaller than the fourth threshold values FT4-0 to FT4-M set corresponding to each of the ratios the values between the plurality of parameters C0 to CN, the receiving circuit abnormality determination unit 613 determines that there is the abnormality in the PhyB. In addition, the receiving circuit abnormality determination unit 613 may perform abnormality determination based on only one of the values of the parameters C0 to CN and the ratio between the plurality of parameters C0 to CN.

Alternatively or additionally, the receiving circuit abnormality determination unit 613 may perform the abnormality determination of the PhyB as the error determination method based on the values of the parameters C0 to CN at a first time point included in the log information LI and a changed amount between the values of parameters C0 to CN at a second time point past than the first time point. In this case, in a case where the changed amount of one or more of the parameters C0 to CN is greater than the fifth threshold values FT5-0 to FT5-N set corresponding to the parameters C0 to CN, the receiving circuit abnormality determination unit 613 may determine that there is an abnormality.

According to such a configuration, similar to the above-described first embodiment, the abnormality determination of the PhyB can be performed using the one or more parameters C0 to CN of the DFE circuit 33. In addition, the present modification example can also be applied to all embodiments described later.

Second Embodiment

Next, a second embodiment will be described. The present embodiment is an example in which the error occurrence frequency detection unit 612 is provided in the storage device 20 instead of the host system 10. Configurations other than those described below are the same as those in the first embodiment.

Figure 8:
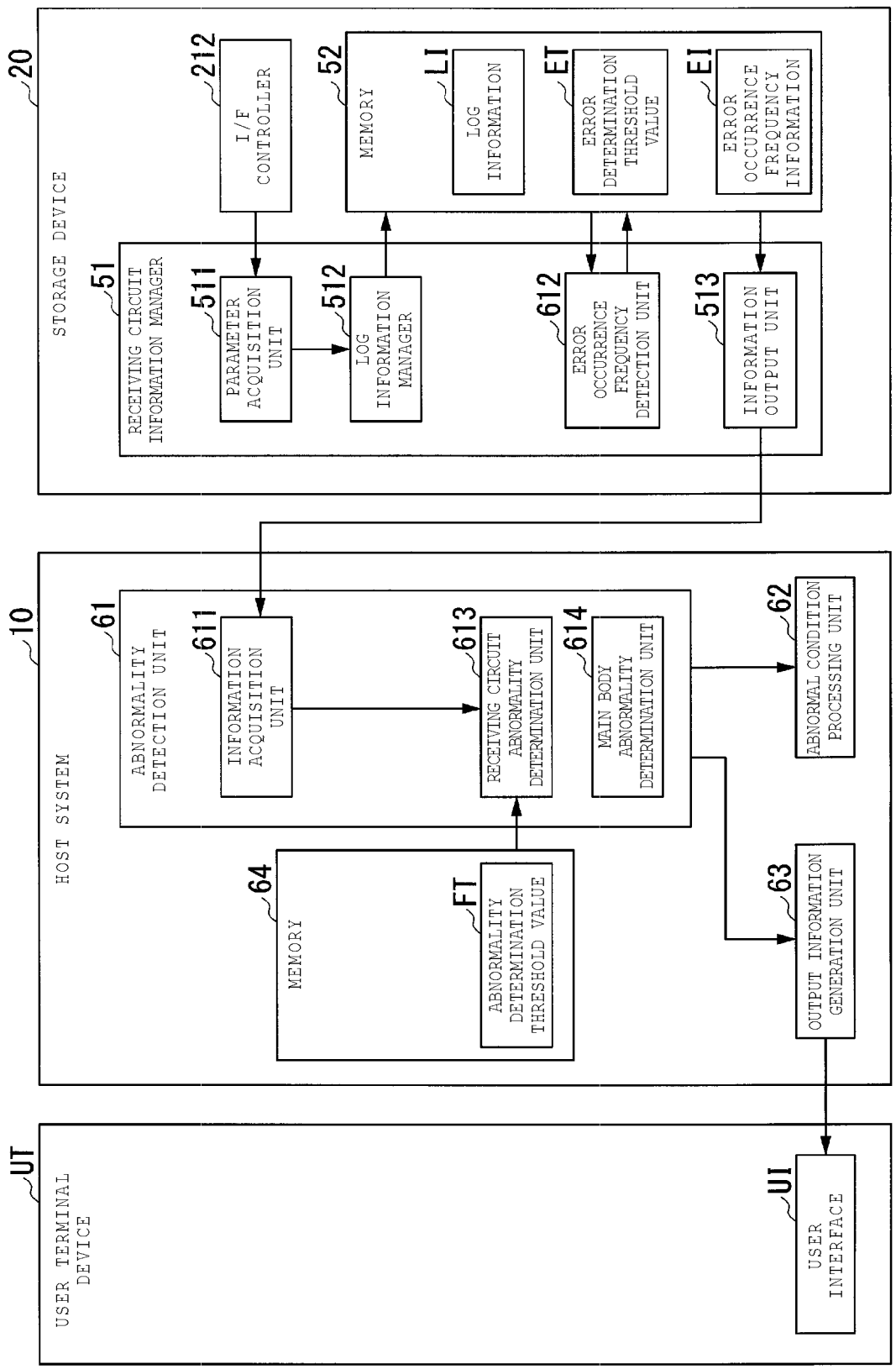
FIG. 8 is a block diagram illustrating a functional configuration of a part of each of a host system, a storage device, and a user terminal device of a second embodiment.

FIG. 8 is a block diagram illustrating an example of the information processing system 1 of the second embodiment. In the present embodiment, the receiving circuit information manager 51 of the storage device 20 includes the error occurrence frequency detection unit 612. The error occurrence frequency detection unit 612 reads out the log information LI and the error determination threshold value ET from the memory 52. The error occurrence frequency detection unit 612 detects the error occurrence frequency relating to the parameters C0 to CN of the DFE circuit 33. The error occurrence frequency detection unit 612 stores information indicating the occurrence frequency of the detected error (hereinafter, referred to as "error frequency information EI") to the memory 52.

In a case where the request to transmit the error frequency information EI is notified from the host system 10 to the storage device 20, the information output unit 513 reads out the error frequency information EI from the memory 52 and transmits the read information to the host system 10. The "error frequency information EI" is an example of "information on the state of the receiving circuit", an example of "information obtained based on the one or more parameters of the decision feedback equalizer", and an example of "information obtained based on the log information". In addition, the information output unit 513 may transmit the error frequency information EI to the host system 10 at the predetermined cycle regardless of the request from the host system 10.

The receiving circuit abnormality determination unit 613 of the host system 10 performs the abnormality determination of the PhyB of the storage device 20 based on the error frequency information EI acquired from the storage device 20 and the abnormality determination threshold value FT read out from the memory 52.

FIGS. 9A to 9C are flowcharts illustrating an example of a flow of processing of the information processing system 1 of the present embodiment. FIGS. 9A to 9C relate to a flow of processing for determining an abnormality in the storage device 20 at the time of connection operation between the host system 10 and the storage device 20. FIG. 9A illustrates the operation of the user terminal device UT. FIG. 9B illustrates the operation of the host system 10. FIG. 9C illustrates the operation of the storage device 20.

In the present embodiment, the "DFE information" is replaced with the "error frequency information EI" with respect to the processing flow of the first embodiment described with reference to FIGS. 7A to 7C. In addition, in the operation of the storage device 20, the error occurrence frequency is detected by the error occurrence frequency detection unit 612 between the processing in S203 and the processing in S204 (S211). The detection of the error occurrence frequency and the abnormality determination of the receiving circuit are not limited to the connection operation between the host system 10 and the storage device 20. However, the detection of the error occurrence frequency and the abnormality determination in the receiving circuit maybe performed at the predetermined cycle after the connection between the host system 10 and the storage device 20 is established.

According to such a configuration, similar to the first embodiment, the storage device 20, the host system 10, and the information processing system 1 suitable for detecting the abnormality in the PhyB of the storage device 20 can be provided.

Third Embodiment

Next, a third embodiment will be described. The present embodiment is an example in which the error occurrence frequency detection unit 612 and the receiving circuit abnormality determination unit 613 are provided in the storage device 20 instead of the host system 10. Configurations other than those described below are the same as those in the second embodiment.

Figure 10:
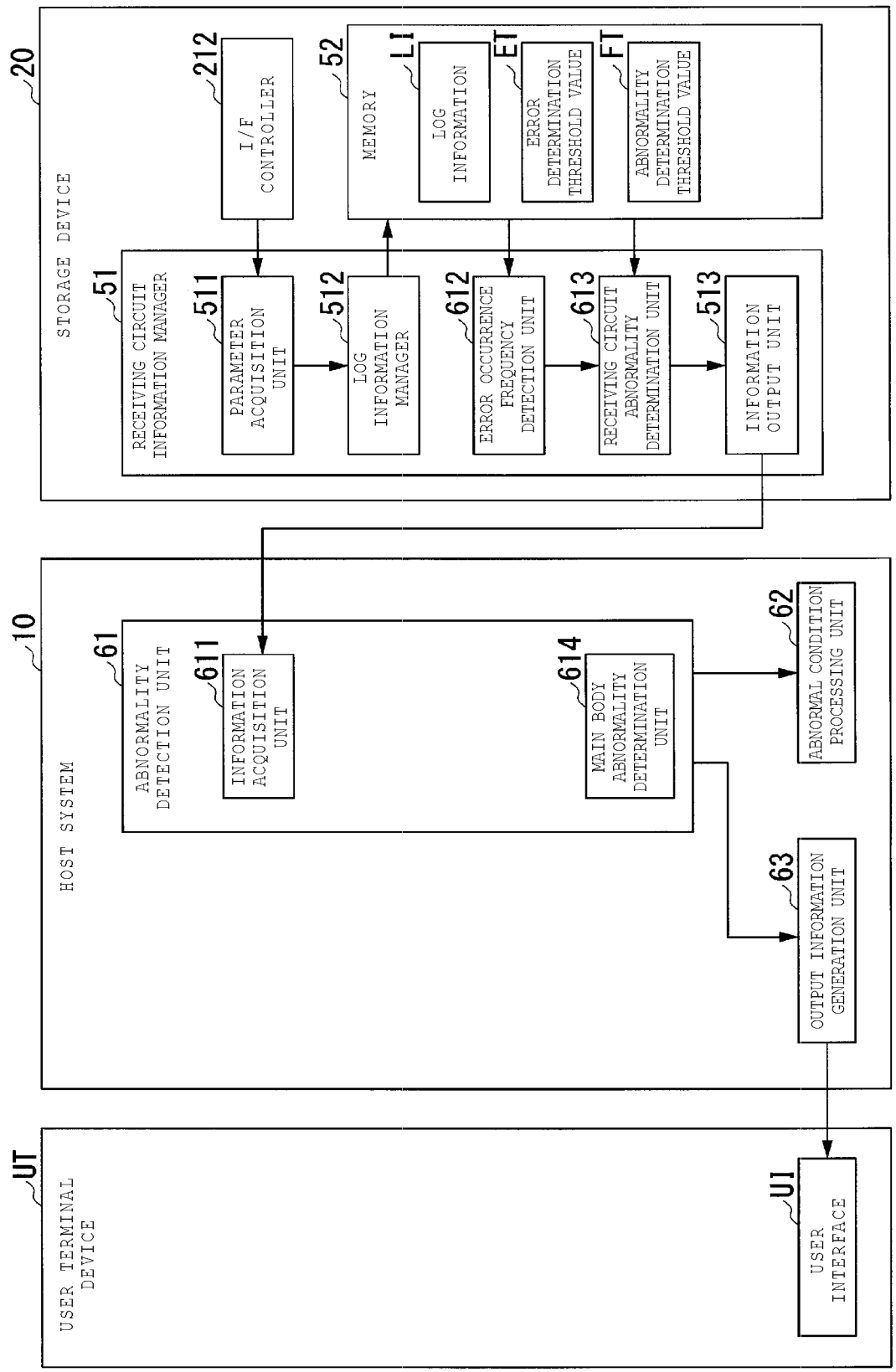
FIG. 10 is a block diagram illustrating a functional configuration of a part of each of a host system, a storage device, and a user terminal device of a third embodiment.

FIG. 10 is a block diagram illustrating an example of the information processing system 1 of the third embodiment. In the present embodiment, the receiving circuit information manager 51 of the storage device 20 includes the error occurrence frequency detection unit 612 and the receiving circuit abnormality determination unit 613. The receiving circuit abnormality determination unit 613 performs the abnormality determination of the PhyB of the storage device 20 based on the error frequency information EI received from the error occurrence frequency detection unit 612 and the abnormality determination threshold value FT read out from the memory 52. In a case where it is determined that there is the abnormality in the PhyB, the receiving circuit abnormality determination unit 613 outputs information indicating the abnormality in the PhyB (hereinafter, referred to as "receiving circuit abnormality information") to the information output unit 513.

In a case where the receiving circuit abnormality determination unit 613 determines that there is an abnormality in the PhyB, the information output unit 513 transmits the receiving circuit abnormality information to the host system 10. The "receiving circuit abnormality information" is an example of "information on the state of the receiving circuit", an example of "information obtained based on the one or more parameters of the decision feedback equalizer", an example of "information obtained based on the log information", and an example of "information indicating the abnormality in the receiving circuit".

FIGS. 11A to 11C are flowcharts illustrating an example of a flow of processing of the information processing system 1 of the present embodiment. FIGS. 11A to 11C relate to a flow of processing for determining abnormality in the PhyB of the storage device 20 at the time of connection operation between the host system 10 and the storage device 20. FIG. 11A illustrates the operation of the user terminal device UT. FIG. 11B illustrates the operation of the host system 10. FIG. 11C illustrates the operation of the storage device 20.

The present embodiment differs from the flow of processing of the second embodiment described with reference to FIGS. 9A to 9C only in the following points. That is, in the processing of S103, the host system 10 requests only the main body information of the storage device 20 without requesting the information on the DFE circuit 33. Accordingly, the storage device 20 transmits only the main body information of the storage device 20 according to the request from the host system 10.

In the present embodiment, after the processing in S211, the receiving circuit abnormality determination unit 613 performs the abnormality determination of the PhyB (S221). In a case where the receiving circuit abnormality determination unit 613 determines that there is an abnormality in the PhyB (S221: YES), the information output unit 513 transmits the receiving circuit abnormality information to the host system 10 (S222).

In the present embodiment, the abnormality detection unit 61 of the host system 10 determines whether the receiving circuit abnormality information is received from the storage device 20 (S121). In a case where the receiving circuit abnormality information is received from the storage device (S121: YES), the abnormal condition processing unit 62 performs the predetermined operation to transition the information processing system 1 to the safe side (S107). On the other hand, in a case where the receiving circuit abnormality information is not received from the storage device 20 (S121: NO), the connection between the host system 10 and the storage device 20 is established (S108 and S205). The detection of the error occurrence frequency and the abnormality determination of the receiving circuit are not limited to the connection operation between the host system 10 and the storage device 20. However, the detection of the error occurrence frequency and the abnormality determination in the receiving circuit may be performed at the predetermined cycle after the connection between the host system 10 and the storage device 20 is established.

According to such a configuration, similar to the first embodiment, the storage device 20, the host system 10, and the information processing system 1 suitable for detecting the abnormality in the PhyB of the storage device 20 can be provided.

Fourth Embodiment

Next, a fourth embodiment will be described. The present embodiment is an example including an example in which the receiving circuit abnormality determination unit 613 of the storage device 20 determines that there is the abnormality in the receiving circuit, and the receiving circuit abnormality information is included in the response to the request (for example, a request for writing or reading out the data) from the host system 10. Configurations other than those described below are the same as those in the third embodiment.

Figure 12:
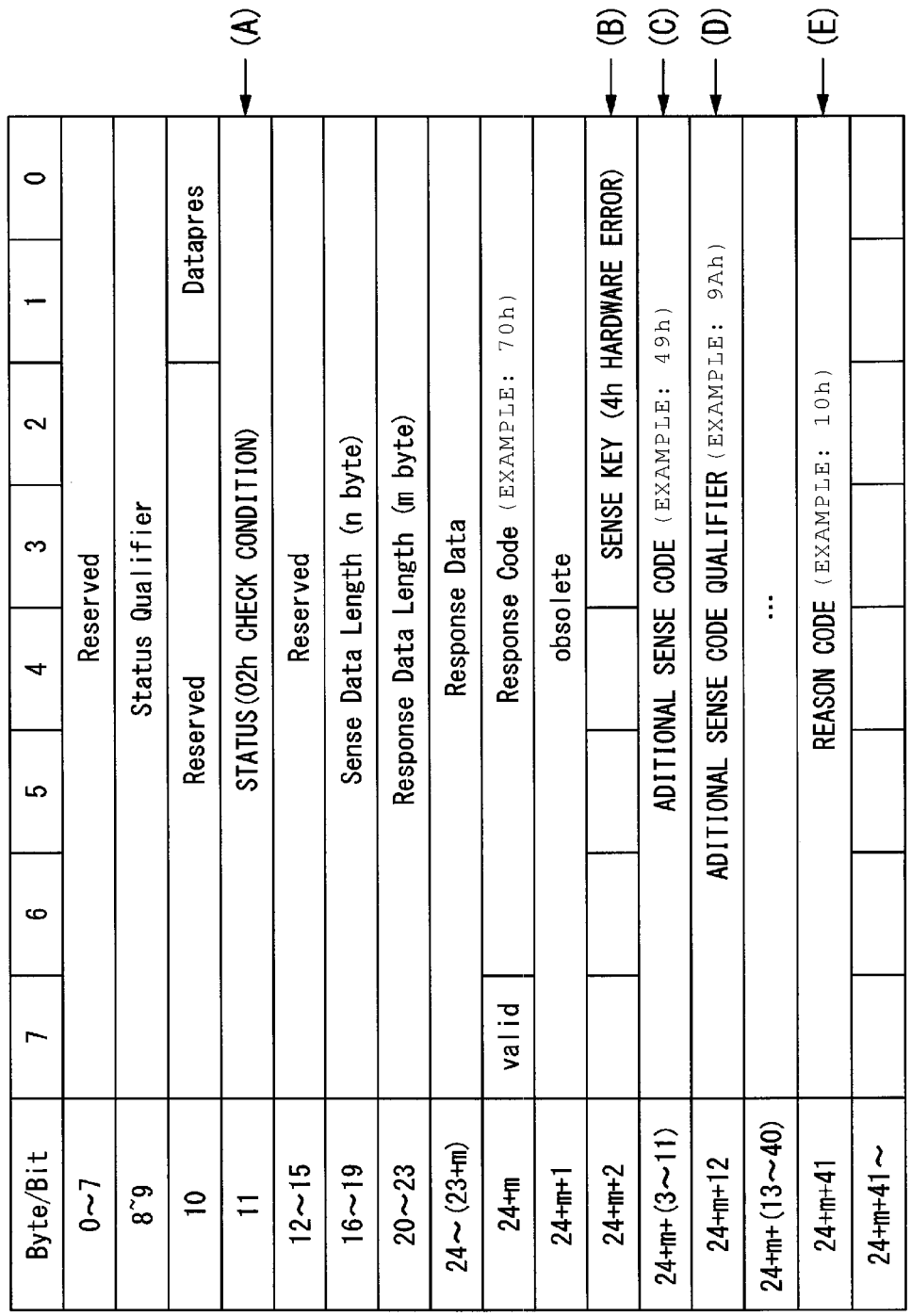
FIG. 12 is a diagram illustrating a format of response information transmitted to the host system in response to a read or write request from the host system.

FIG. 12 is a diagram illustrating an example of response information to the host system 10. FIG. 12 illustrates a response information format specified by the SAS, for example. In a case where the request from the host system 10 is normally processed, the storage device 20 transmits the response information according to the format to the host system 10, whereby notifying the host system 10 of an execution completion of the request.

In the present embodiment, in a case where the request from the host system 10 cannot be normally processed due to the abnormality in the PhyB, by including the receiving circuit abnormality information to the response information transmitted with respect to the request from the host system 10, the information output unit 513 of the storage device 20 notifies the host system 10 of that there is the abnormality in the PhyB. The information indicating that there is the abnormality is included in the response information format can be included in the response information format specified by the SAS by registering "02h CHECK CONDITION" in a code of STATUS of Byte 11 ((A) in FIG. 12). In addition, the type of the abnormality is registered in the subsequent SENSE KEY, ADDITIONAL SENSE CODE, ADDITIONAL SENSE CODE QUALIFIER, and REASON CODE ((B) to (E) in FIG. 12).

For example, in a case of including information indicating that there is the abnormality in the PhyB in the form, since the abnormality in the receiving circuit is the abnormality in the hardware, "4h HARDWARE ERROR" is registered in the code of SENSE KEY. In the present embodiment, by assigning new code contents (code contents distinguishable from other code contents) not specified by the SAS to any one or more of ADDITIONAL SENSE CODE, ADDITIONAL SENSE CODE QUALIFIER, or REASON CODE, the information indicating that there is the abnormality in the PhyB is included in the form. FIG. 12 illustrates an example in which as the code content indicating that there is the abnormality in the PhyB, "49h" is registered in ADDITIONAL SENSE CODE, "9Ah" is registered in ADDITIONAL SENSE CODE QUALIFIER, and "10h" is registered in REASON CODE.

Next, the flow of processing of the information processing system 1 of the present embodiment will be described. In the present embodiment, during execution of the request (for example, a data write request or a data read request) from the host system 10, the storage device 20 includes the receiving circuit abnormality information in the response information with respect to the request in a case where the receiving circuit abnormality determination unit 613 determines that there is the abnormality in the PhyB. In addition, in a case where the receiving circuit abnormality determination unit 613 determines that there is the abnormality in the PhyB before the request from the host system 10, the storage device 20 includes the receiving circuit abnormality information in the response information immediately after the determination. That is, the detection of the abnormality does not need to be synchronized with the request from the host system 10, and may be executed asynchronously with the request from the host system 10 as a part of the background processing in advance.

FIGS. 13A to 13C are flowcharts illustrating an example of a flow of processing of the information processing system 1 of the present embodiment. FIGS. 13A to 13C relate to a flow of processing for determining abnormality in the storage device 20 at the time of connection operation between the host system 10 and the storage device 20. FIG. 13A illustrates the operation of the user terminal device UT. FIG. 13B illustrates the operation of the host system 10. FIG. 13C illustrates the operation of the storage device 20.

As illustrated in FIGS. 13A to 13C, the host system 10 notifies the storage device 20 of the request (for example, the read request or the write request of the data) (S150). The storage device 20 performs the abnormality determination of the PhyB based on the information (for example, the log information LI) relating to the parameters C0 to CN of the DFE circuit 33 (S250). The abnormality determination of the PhyB maybe based on the error frequency information EI and similar to the modification example of the first embodiment, may be directly based on the values of the parameters C0 to CN.

In a case where the receiving circuit abnormality determination unit 613 determines that there is no abnormality in the PhyB (S250: NO), the information output unit 513 does not include the receiving circuit abnormality information in the response information to the host system 10. Therefore, in a case where there are no other abnormalities, the storage device 20 generates normal response information (S251). On the other hand, the receiving circuit abnormality determination unit 613 determines that there is the abnormality in the PhyB (S250: YES), the information output unit 513 includes the receiving circuit abnormality information in the response information to the host system 10. Therefore, the response information including the receiving circuit abnormality information is generated (S252). The storage device 20 transmits the generated response information to the host system 10 (S253).

In a case where the response information is received from the storage device 20, the abnormality detection unit 61 of the host system 10 determines whether the content indicating the abnormality (including the abnormality in other than the receiving circuit) in the storage device 20 is not included in the response information. In a case where the content indicating the abnormality in the storage device 20 is not included in the response information, the abnormality detection unit 61 determines whether the abnormality in the storage device 20 is the abnormality in the PhyB based on the code content included in the response information (S151). In a case where the abnormality in the storage device 20 is the abnormality in the PhyB, the abnormal condition processing unit 62 of the host system 10 performs the predetermined operation to transition the information processing system 1 to the safe side (S107). For example, the abnormal condition processing unit 62 performs at least one of an operation to stop the storage device 20, an operation to prevent processing on the storage device 20, and an operation to release the connection state of the host system 10 and the storage device 20.

According to such a configuration, similar to the first embodiment, the storage device 20, the host system 10, and the information processing system 1 suitable for detecting the abnormality in the PhyB of the storage device 20 can be provided. In addition, according the present embodiment, by using the response information to the host system 10, the abnormality in the PhyB can be notified to the host system 10. Accordingly, it is possible to perform the processing of the storage device 20 while notifying the host system 10 of the abnormality in the PhyB. In the present embodiment, the example in which the receiving circuit abnormality information is included in the response information for the read request or the write request from the host system 10 is shown. However, the receiving circuit abnormality information may be included in the response information for other requests.

Fifth Embodiment

Next, a fifth embodiment will be described. The present embodiment is an example in which, in a case where it is determined that there is the abnormality in the PhyB, the host system 10 adjusts the output voltage, the communication speed, or the like to continue the safe operation of the storage device 20 determined to be abnormal. Configurations other than those described below are the same as those in the first embodiment.

Figure 14:
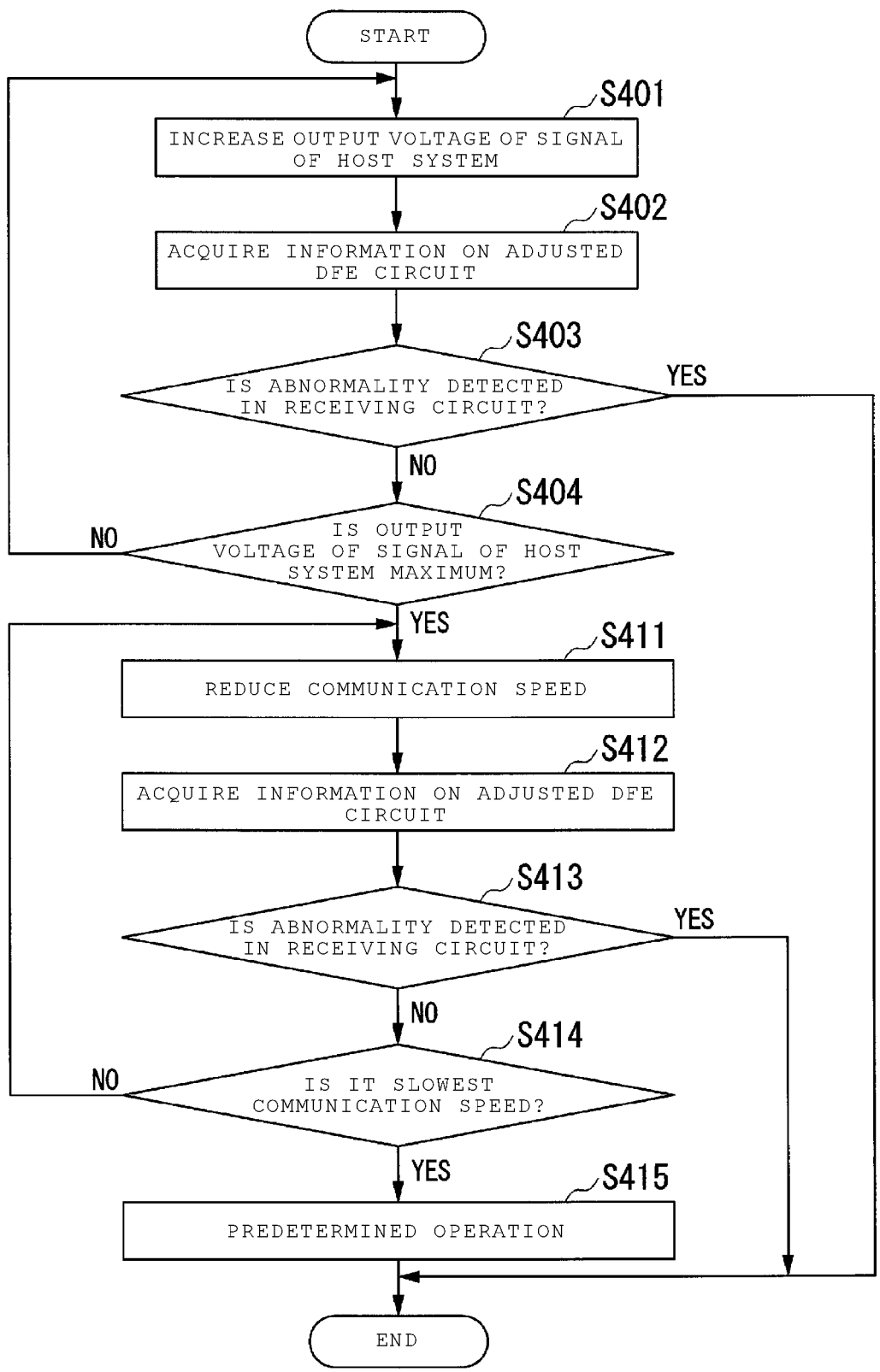
FIG. 14 is a flowchart illustrating an example of a flow of processing of an information processing system of a fifth embodiment.

FIG. 14 is a flowchart illustrating an example of a flow of processing of the information processing system 1 of the present embodiment. In particular, in FIG. 14, the processing flow of the host system 10 after it is determined that there is an abnormality in the PhyB is depicted. As a premise, it is assumed that an instruction to continue the operation of the storage device 20 as much as possible is applied to the host system 10 in advance from the user terminal device UT even in a case where it is determined that there is the abnormality in the PhyB.

As illustrated in FIG. 14, in the present embodiment, in a case where it is determined that there is the abnormality in the PhyB, the abnormal condition processing unit 62 of the host system 10 increases the output voltage of the signal transmitted from the host system 10 to the storage device 20 (S401). For example, the host system 10 increases the output voltage of the signal by the emphasis circuit 31 of the PhyA.

In a case where the output voltage of the signal from the host system 10 is increased, the storage device 20 adjusts the parameters C0 to CN of the DFE circuit 33 based on the signal. The information output unit 513 of the storage device 20 transmits the information on the adjusted parameters C0 to CN of the DFE circuit 33 to the host system 10. The "information on the adjusted DFE circuit 33" may be, for example, the adjusted values of the parameters C0 to CN of the DFE circuit 33, and may be the determination result of the abnormality determination of the PhyB based on the adjusted values of the parameters C0 to CN of the DFE circuit 33.

The abnormality detection unit 61 of the host system 10 acquires the information on the adjusted DFE circuit 33 from the storage device 20 (S402). The abnormality detection unit 61 determines whether the abnormality in the PhyB is released based on the information on the adjusted DFE circuit 33 (S403). For example, in a case where the adjusted values of the parameters C0 to CN of the DFE circuit 33 is acquired as the information on the adjusted DFE circuit 33, the abnormality detection unit 61 determines whether the abnormality in the PhyB is no longer present based on the parameters C0 to CN. In addition, in a case where the determination result of the abnormality determination of the PhyB is acquired as the information on the adjusted DFE circuit 33, the abnormality detection unit 61 determines whether the abnormality in the PhyB is no longer present based on the determination result of the abnormality determination of the PhyB performed by the storage device 20.

In a case where the abnormality in the PhyB is no longer present (S403: YES), the host system 10 continues the operation of the storage device 20 at the output voltage of the signal. On the other hand, in a case where the abnormality in the PhyB is not released (S403: NO), the abnormal condition processing unit 62 of the host system 10 determines whether the output voltage of the signal of the host system 10 is the allowable maximum voltage (S404).

In a case where the output voltage of the signal of the host system 10 is not maximum voltage (S404: NO), the abnormal condition processing unit 62 returns the processing in S401 and repeats the processing in from S401 to S403. On the other hand, in a case where the output voltage of the signal of the host system 10 is the maximum voltage (S404: YES), the abnormal condition processing unit 62 attempts to continue to the operation of the storage device 20 by adjusting the communication speed.

That is, as long as the communication speed is not the minimum allowable speed, the abnormal condition processing unit 62 of the host system 10 decreases the communication speed by one level (S411). For example, in the SAS, 1.5 Gbps, 3 Gbps, 6 Gbps, and 12 Gbps are defined as the communication speed. For example, in a case where it is determined that there is the abnormality in the PhyB in a state where the communication is established at the communication speed of 12 Gbps, the abnormal condition processing unit 62 decreases the communication speed to 6 Gbps.

In a case where the communication speed is decreased, the storage device 20 adjusts the parameters C0 to CN of the DFE circuit 33 based on the communication speed thereof. The information output unit 513 of the storage device 20 transmits the information on the adjusted DFE circuit 33 to the host system 10. The "information on the adjusted DFE circuit 33" may be, for example, the values of the parameters C0 to CN of the adjusted DFE circuit 33 and may be the determination result of the abnormality determination of the PhyB based on the values of the parameters C0 to CN of the adjusted DFE circuit 33.

The abnormality detection unit 61 of the host system 10 acquires the information on the adjusted DFE circuit 33 from the storage device 20 (S412). The abnormality detection unit 61 determines whether the abnormality in the PhyB is no longer present based on the information on the adjusted DFE circuit 33 (S413). For example, in a case where the values of the parameters C0 to CN of the adjusted DFE circuit 33 are acquired as the information on the adjusted DFE circuit 33, the abnormality detection unit 61 determines whether the abnormality in the PhyB is no longer present based on the parameter values C0 to CN. In addition, in a case where the determination result of the abnormality determination of the PhyB is acquired as the information on the adjusted DFE circuit 33, the abnormality detection unit 61 determines whether the abnormality in the PhyB is released based on the determination result of the abnormality determination of the PhyB performed by the storage device 20.

In a case where the abnormality in the PhyB is released (S413: YES), the host system 10 continues the operation of the storage device 20 at the communication speed. On the other hand, in a case where the abnormality in the PhyB is still present(S413: NO), the abnormal condition processing unit 62 of the host system 10 determines whether the communication speed is allowable minimum speed (S414).

Ina case where the communication speed is not the minimum speed (S414: NO), the abnormal condition processing unit 62 returns to the processing in S411 and repeats the processing in S411 to S413. On the other hand, in a case where the communication speed is the minimum speed (S414: YES), the abnormal condition processing unit 62 determines that it is difficult to continue the operation of the storage device 20, and performs the predetermined operation to transition the information processing system 1 to the safe side (S415). The predetermined operation is, for example, at least one of an operation to stop the storage device 20, an operation to prevent processing on the storage device 20, and an operation to release the connection state of the host system 10 and the storage device 20.

According to such a configuration, similar to the first embodiment, the storage device 20, the host system 10, and the information processing system 1 suitable for detecting the abnormality in the PhyB of the storage device 20 can be provided. In addition, according to the present embodiment, in a case where it is desired to reduce the operation cost of the information processing system 1, the availability of the storage device 20 can be enhanced.

For example, even in a case where it is determined that there is an abnormality in the PhyB, there is a possibility that actually, there is no abnormality in the PhyB and the voltage level of the signal of the host system 10 reaching the storage device 20 is low for some reasons. Accordingly, in a case where it is determined that there is the abnormality in the PhyB, the abnormal condition processing unit 62 of the present embodiment increases the output voltage of the signal transmitted from the host system 10. With such a configuration, by increasing the voltage level of the signal reaching the storage device 20, the storage device 20 can be safely continued to be used.

In addition, even in a case where it is determined that there is the abnormality in the PhyB, in a case of lowering the communication speed, the operation of the PhyB is improved in some cases. Therefore, in a case where it is determined that there is the abnormality in the PhyB, the abnormal condition processing unit 62 of the present embodiment lowers the communication speed.

The operation of increasing the output voltage of the signal transmitted from the above-described host system 10 and the operation of lowering the communication speed may be performed in the reverse order. In addition, only either one of the operation of increasing the output voltage of the signal transmitted from the above-described host system 10 and the operation of lowering the communication speed may be performed.

Here, the possibility that it is determined that the PhyB is abnormal increases as the communication speed increases. Thus, for example, in a case where it is determined that there is an abnormality in the PhyB in a state where the host system 10 is communicating with the storage device 20 at a certain communication speed (for example, a communication speed faster than 12 Gbps), the host system 10 may reduce the communication speed (for example, a communication speed of 12 Gbps or lower). By performing such an operation, the availability of the storage device 20 can be enhanced.

Although some embodiments and modification examples have been described above, the embodiments are not limited to the above examples. For example, the "receiving circuit" is not limited to that including the DFE circuit 33. For example, the PhyB may have a circuit (so-called an 8B10B circuit) for converting data between 8 bits and 10 bits. In this circuit, in a case where the abnormality occurs, electric charge may be based on the circuit. In this case, the receiving circuit information manager 51 detects the deviation of the charge based on a running disparity (RD). The error occurrence frequency detection unit 612 determines an error in a case where the degree of charge deviation exceeds the threshold value and counts the number of errors. The receiving circuit abnormality determination unit 613 determines the abnormality in the receiving circuit based on the error relating to the deviation of the electric charge. With such a configuration, it is possible to provide the storage device 20, the host system 10, and the information processing system 1 suitable for detecting the abnormality in the PhyB of the storage device 20. The information indicating the deviation of the charge or the information on the number of the errors is an example of "information on the state of the receiving circuit". Even in these cases, the error occurrence frequency detection unit 612 and the receiving circuit abnormality determination unit 613 may be provided in the host system 10 or may be provided in the storage device 20.

According to at least one embodiment described above, the storage device includes the information output unit that outputs information on the state of the receiving circuit to the host system. According to such a configuration, it is possible to provide the storage device suitable for detecting an abnormality in the receiving circuit.

In addition, according to the embodiments described above, an abnormality is detected along a transmission line from a transmission side of host device and a reception side of storage device. It is also possible to detect an abnormality along a transmission line from a transmission side of storage device and a reception side of host device if DFE information of host device can be obtained.

Hereinafter, some storage devices, host systems, and information processing systems will be supplementarily described.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A storage device comprising:
   a receiving circuit including a correction circuit configured to correct an input signal from a host system based on parameters and output the corrected input signal as an output signal containing a data value that is to be stored in the storage device;
   an interface controller configured to adjust the parameters based on a difference value generated by the correction circuit using the output signal; and
   a transmission circuit configured to transmit the parameters to the host system.

2. The storage device according to claim 1, wherein the correction circuit includes a decision feedback equalizer circuit.

3. The storage device according to claim 2, wherein the decision feedback equalizer circuit includes a feedback filter configured to produce a filtered signal of the output signal based on the correction signal and a comparator configured to generate the output signal based on a signal level of the filtered signal added to the input signal.

4. The storage device according to claim 3, wherein the interface controller is configured to adjust the parameters based on a difference between the output signal and a sum of the filtered signal and the input signal.

5. The storage device according to claim 1, further comprising:
   a memory in which the parameters are stored at different points in time and a log of the parameters containing the parameters at each of the different points in time is maintained.

6. The storage device according to claim 5, wherein the log is transmitted to the host system through the transmission circuit.

7. The storage device according to claim 5, further comprising:
   a processor configured to determine a state of abnormality in the receiving circuit based on the parameters, and control the transmission circuit to transmit a notification of the state of abnormality in the receiving circuit to the host system.

8. The storage device according to claim 7, wherein the processor is configured to control the transmission circuit to transmit the notification of the state of abnormality in the receiving circuit to the host system in response to a read or write request received from the host system.

9. A host system connected to a storage device, comprising:
   a first receiving circuit through which information relating to an abnormality in a second receiving circuit of the storage device is received; and
   a processor configured to execute a predetermined operation in response to a determination of an abnormality in the second receiving circuit of the storage device,
   wherein the predetermined operation includes one of (1) stopping writing and reading of data to and from the storage device, (2) allowing reading of data from the storage device but not allowing writing of data thereto, and (3) connecting to a different storage device.

10. The host system according to claim 9, wherein the processor is configured to determine the abnormality in the second receiving circuit based on parameters that are applied to the second receiving circuit and received from the storage device.

11. The host system according to claim 10, wherein the parameters are received from the storage device through the first receiving circuit.

12. The host system according to claim 11, wherein the parameters are received as a log containing parameters applied to the second receiving circuit at each of multiple points in time.

13. The host system according to claim 12, wherein the processor is configured to determine the abnormality based on upper limit or lower limit values of the parameters.

14. The host system according to claim 12, wherein the processor is configured to determine the abnormality based on a ratio of two of the parameters.

15. The host system according to claim 12, wherein the processor is configured to determine the abnormality based on a frequency the parameters are outside a normal range.

16. The host system according to claim 9, wherein the processor is configured to determine the abnormality based on the information received from the storage device.

17. A host system connected to a storage device, comprising:
   a first receiving circuit through which information relating to an abnormality in a second receiving circuit of the storage device is received;
   a transmission circuit through which a host output signal is transmitted to the storage device; and
   a processor configured to execute a predetermined operation in response to a determination of an abnormality in the second receiving circuit,
   wherein the predetermined operation includes one of (1) increasing an output voltage of the host output signal and (2) lowering a communication speed established between the host system and the storage device.

18. The host system according to claim 17, wherein the processor is configured to determine the abnormality in the second receiving circuit based on parameters that are applied to the second receiving circuit and received from the storage device.

19. The host system according to claim 18, wherein the parameters are received from the storage device through the first receiving circuit.

20. The host system according to claim 19, wherein the parameters are received as a log containing parameters applied to the second receiving circuit at each of multiple points in time.

* * * * *